Feb. 27, 1940.   C. F. WHITEMAN ET AL   2,192,058
MAGNETIC INDICATOR FOR WATT-HOUR METERS
Filed Nov. 9, 1939
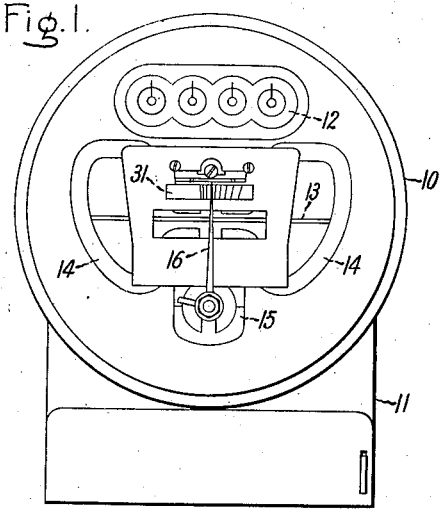
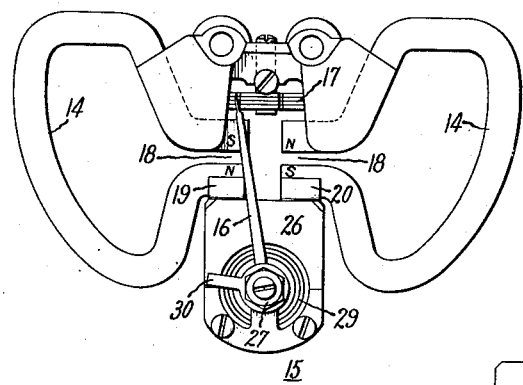
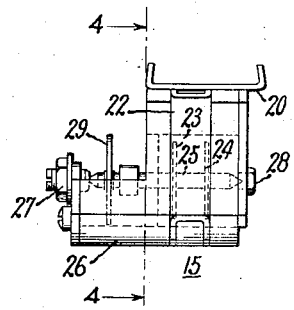
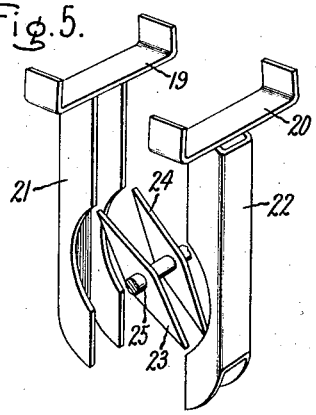
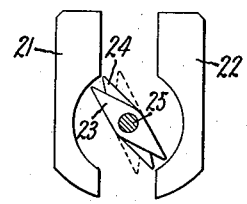
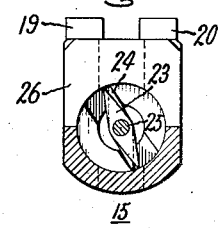
Inventors:
Clarence F. Whiteman,
Wayne A. Halliday,
by Harry E. Dunham
Their Attorney.

Patented Feb. 27, 1940

2,192,058

UNITED STATES PATENT OFFICE 2,192,058

MAGNETIC INDICATOR FOR WATT-HOUR METERS

Clarence F. Whiteman, Parma, and Wayne A. Halliday, Geneva, Ohio, assignors to General Electric Company, a corporation of New York Application November 9, 1939, Serial No. 303,638

6 Claims. (Cl. 177—311)

Our invention relates to a magnetic indicator primarily for use on integrating meters such as watt-hour meters to indicate the condition of the permanent drag magnet or magnets on such meters. Watt-hour meters are occasionally subjected to momentary heavy current surges generally caused by lightning. Such surges in or adjacent the meter may leave no visible evidence that they have occurred but oftentimes partially demagnetize the permanent drag magnets of such meters. The result of such demagnetization is that the calibration of the meter is disturbed and the meter thereafter generally runs too fast. The meter may remain in this condition without detection for months or years until it is recalibrated.

The object of our invention is to provide a small, relatively inexpensive indicator that will show at a glance that the drag magnets have been weakened in order that the mischief may be detected and corrected promptly.

In carrying our invention into effect we provide a small magnetic vane indicating instrument and associate it with the permanent magnet or magnets of the meter in such a way that a very small percentage of the permanent magnet flux passes through and influences the magnetic indicator. If the permanent magnet strength is changed, the indicator responds and indicates such fact.

The features of our invention which are believed to be novel and patentable will be pointed out in the claims appended hereto. For a better understanding of our invention reference is made in the following description to the accompanying drawing in which Fig. 1 shows a front view of a watt-hour meter to which our invention has been applied. Fig. 2 is a front view of a conventional drag magnet assembly for an integrating meter showing how our indicator may be applied. Fig. 3 is a side view of a preferred form of our indicator. Fig. 4 is a sectional view of the indicator of Fig. 3 taken on line 4—4 thereof. Fig. 5 is a perspective view of the magnetic circuit of such indicator and Fig. 6 is a diagram indicating the intended deflection range of the indicator.

In Fig. 1, 10 represents the casing of a glass cover watt-hour meter of common construction. 11 represents the terminal chamber, 12 the register, 13 the rotary induction disk of conducting material, and 14 the two U-shaped drag magnets which embrace the disk and produce a constant flux through disk 13 to control its speed. It will be understood that there is an induction driving electromagnetic system in the back portion of the meter energized in proportion to the current and voltage of the metered circuit which produces rotation of disk 13 at a speed proportional to watts, and that the meter measures watt-hours on register 12 which is driven by the meter. Our indicator is represented at 15 and the pointer thereof at 16. The pointer is thus clearly visible through the glass cover and the device does not require any rearrangement of the usual watt-hour meter construction. While a watt-hour meter has been mentioned, the invention is applicable to any integrating meter employing a permanent magnet damping system.

The permanent drag magnets more clearly shown in Fig. 2 produce a flux across the air gap at 18 in which the disk is located and produce a retarding force on the disk when it is rotated. This retarding force is made just sufficient to have the meter register accurately. Such meters are calibrated before being put in service and carefully checked with an accurate standard meter. If the meter is too slow, the damping may be reduced. This may be done by moving the drag magnet assembly so that its flux acts on the disk at a smaller radius. Final adjustment may be made by an adjustable shunt represented at 17 in Fig. 2, and this shunt may also include magnetic material, the permeability of which varies with temperature to automatically compensate the meter for certain temperature errors. The polarity of the two U-shaped permanent magnets is represented by the designations "N" and "S" on their pole pieces and is such that the greater part of the flux is forced across the disk air gap. These magnets produce damping fluxes through the disk in opposite directions at closely adjacent points.

After having been calibrated and placed in service, it is important that the drag magnets remain at a constant strength because any weakening thereof will cause the meter to overregister, and great care is taken in the manufacture and aging of such magnets prior to their use to assure that they will remain of constant strength in use.

In spite of all of these precautions, it is not uncommon to find that the meter calibration has been destroyed by a demagnetization of the permanent magnets caused by heavy current surges in the meter wiring or in some closely adjacent conductor. Such current surges may reach many thousands of amperes momentarily and may be oscillatory in character. If the flux produced links one or both of the drag magnets, decalibration of the meter is probable.

Our indicator detects such weakening of the permanent magnets as will now be explained.

Our indicator in the form shown has a skeleton form of magnet circuit as represented in Fig. 5 consisting of clips 19 and 20, downwardly extending, channel-shaped pieces 21 and 22 cut out to form pole piece arcs between which the magnetic vane armature is located. The armature has two vanes 23 and 24 in this case and these vanes are spaced on shaft 25 so as to be opposite the sides of the channel-shaped pole pieces 21 and 22. This magnetic circuit is supported in a suitable casing structure 26 which is of non-magnetic material and preferably of conducting material, for example, brass. The casing structure is shown in Figs. 2, 3 and 4. This casing structure supports bearings 27 and 28 for shaft 25 and an adjustable spiral control spring 29 fastened between the adjusting lever 30 and shaft 25. If the casing structure is made of conducting material it helps to shield the magnetic circuit thereof from external magnetic influences.

The clips 19 and 20 are spaced and shaped to be clipped over the lower pole pieces of the two permanent magnets which make up the drag magnet system, as best shown in Fig. 2. These clips have sufficient resiliency that they hold the instrument firmly in place when thus assembled to the drag magnets.

Now it will appear that we have provided a rather high reluctance leakage flux path between the two lower pole pieces of the permanent magnets. The spaced upper pole pieces of the two magnets are also included in the path of the leakage flux. These pole pieces are of opposite magnetic polarity and a small percentage of the total flux of such magnets is diverted through the instrument and its magnetic vanes 23 and 24. This does not weaken the permanent magnets but it does slightly reduce the flux that will cross the damping disk air gaps at 18. The diverted flux is, however, constant and is taken into consideration in the original calibration of the meter. That is, the meter is accurately calibrated with the detector instrument in place as shown in Figs. 1 and 2. The spring 29 in the instrument illustrated is arranged to produce a clockwise torque on shaft 25 in opposition to the tendency of the magnetic vanes 23 and 24 to align with the flux crossing between pole pieces 21 and 22. It will be noted that we have in effect provided a pair of parallel magnetic paths through the instrument, one through vane 23 and the other through vane 24. The two vanes are mounted on the shaft 25 at a slight angle to each other and the purpose of this arrangement is to give the instrument a greater deflection sensitivity for a small change in flux strength. The spring 29 is adjusted so that with the permanent magnets at proper calibrated strength, vanes 23 and 24 are positioned about as indicated in full lines in Fig. 6, where vane 24 is in alignment with the tip of the opposite pole pieces and vane 23 is in somewhat better alignment. At this time pointer 16 will be at the left hand graduation of scale 31, see Fig. 1, and this indicates that the drag magnets are of proper strength and the meter in calibration. Upon a rather severe weakening of the drag magnets the armature will turn clockwise such that vane 24 advances to about the dotted line position of Fig. 6, and vane 23 will occupy about the position shown for vane 24 in full lines. If each scale graduation of Fig. 1 represents a 1% change in watthour meter calibration, the indication given indicates that the meter will operate about 3% fast. The angular deflection is small but sufficient to indicate undesirable decalibration weakening of the drag magnets. The plural vane arrangement seems to give somewhat better deflection sensitivity than a single vane would give. We have also tried out a four vane armature with fair results.

It will be noted that the arrangement provides parallel flux paths through the instrument and that through the contemplated deflection range the relative reluctance between different flux paths through the instrument varies and that the total reluctance of the instrument increases with a given reduction in the leakage flux. The change in reluctance in the leakage flux path caused by the deflection of the instrument is therefore in a direction to reduce rather than increase the calibration error of the meter when its permanent magnets are weakened. Stated in another way, the reluctance of the damping flux path remains constant while the reluctance of the leakage flux path increases over that range of flux change for which the apparatus is designed. The result is that a greater percentage of the remaining flux of the weakened permanent magnets goes through the main damping flux path. To the extent that this compensating result is accomplished, it reduces rather than increases the calibration error that occurs in the meter. However, the device is intended primarily as a detector as distinguished from a compensating shunt with respect to errors in meter calibration caused by weakening of the damping magnet system.

The structural details of the indicator can be varied to suit the type and arrangement of drag magnet systems to which it is applied and we do not limit our invention to the particular device which we have used for illustration purposes.

What we claim as new and desire to obtain by Letters Patent of the United States is:

1. In combination with a meter of the integrating type, a rotary armature member therefor of conducting material, permanent magnet means for producing a damping flux through said armature member to control the calibration rate of the meter, and means for detecting a change in the strength of said permanent magnet means such as would alter the calibration of the meter comprising a flux responsive magnetic instrument associated with said permanent magnet means so as to be influenced by a small percentage of the flux produced by said permanent magnet means and responsive to a change in such flux.

2. In an integrating meter a rotary disk of conducting material, a pair of U-shaped permanent magnets for producing damping flux through said disk, said magnets embracing said disk so that the magnets produce fluxes through the disk in opposite directions at closely adjacent points, and means for detecting changes in the strength of such permanent magnets comprising a magnetic vane indicating instrument having its magnetic circuit in the path of leakage flux between opposite polarity pole pieces of the different magnets.

3. In combination, an integrating meter, a casing therefor having a glass cover through which the meter may be read, a rotary disk of conducting material driven by said meter, permanent magnet means for producing a damping flux through said disk to control the calibration rate of the meter, a sensitive flux responsive measuring instrument associated with said permanent magnet means so as to respond to leakage flux therefrom, and an indicator observable through the glass cover of said meter which is moved by said instrument in response to changes in the strength of said permanent magnet means.

4. In combination with an integrating meter, a member of conducting material driven by said meter, permanent magnet damping means for producing a retarding flux through said member to control the calibration rate of said meter, and a magnetic vane indicating instrument secured in fixed relation to said permanent magnet means so as to be influenced by leakage flux therefrom, said instrument having a rotary shaft with a plurality of magnetic vanes thereon and stationary pole pieces for directing flux through said magnetic vanes, thereby providing parallel flux paths through said instrument, the arrangement being such that as said shaft turns through its deflection range the relative reluctance between flux paths through different vanes varies and the total reluctance of said instrument increases as the leakage flux therethrough decreases.

5. In combination, an integrating meter provided with an armature member of conducting material driven by said meter, permanent magnet means for producing a damping flux through said member to control the calibration rate of said meter, and a magnetic circuit providing a leakage flux path for said permanent magnet means and diverting permanent magnet flux from said armature member, said leakage flux magnetic circuit including means for increasing the reluctance of said circuit in response to a decrease in the total magnetic flux produced by said permanent magnet means.

6. An integrating meter having an armature member of conducting material driven thereby, permanent magnet means for producing a damping flux through said member for controlling the calibration rate of the meter, a magnetic vane flux responsive instrument having stationary pole pieces with resilient clip extensions thereon for securing said instrument in fixed relation to said permanent magnet means, said instrument being responsive to leakage flux from said permanent magnet means and serving to detect and indicate changes in the flux strength of said permanent magnet means.

CLARENCE F. WHITEMAN.
WAYNE A. HALLIDAY.